(12) United States Patent
Walter et al.

(10) Patent No.: US 7,341,620 B2
(45) Date of Patent: Mar. 11, 2008

(54) FIRE-INSULATING WALL COVERING AND A PREPARATION METHOD FOR SAME

(75) Inventors: Reinhard Walter, Sondershausen (DE); Arend Johan Veldhoen, AM Raalte (NL)

(73) Assignee: Durisol International Corp., Hamilton, Ontario (CA)

( * ) Notice: Subject to any disclaimer, the term of this patent is extended or adjusted under 35 U.S.C. 154(b) by 196 days.

(21) Appl. No.: 10/552,736

(22) PCT Filed: Apr. 8, 2004

(86) PCT No.: PCT/NL2004/000237

§ 371 (c)(1),
(2), (4) Date: Oct. 11, 2005

(87) PCT Pub. No.: WO2004/089847

PCT Pub. Date: Oct. 21, 2004

(65) Prior Publication Data

US 2006/0225606 A1    Oct. 12, 2006

(30) Foreign Application Priority Data

Apr. 11, 2003  (NL) .................................... 1023149

(51) Int. Cl.
*C09K 21/02* (2006.01)
*C04B 28/02* (2006.01)
*C04B 14/04* (2006.01)
*E04B 1/94* (2006.01)

(52) U.S. Cl. ................. 106/18.12; 106/18.11; 106/731; 106/605; 252/601

(58) Field of Classification Search ............. 106/15.05, 106/18.11, 18.12, 731, 805; 252/601
See application file for complete search history.

(56) References Cited

U.S. PATENT DOCUMENTS

| | | | | |
|---|---|---|---|---|
| 3,753,749 | A | * 8/1973 | Nutt | ............................. 106/731 |
| 4,876,151 | A | * 10/1989 | Eichen | ........................ 428/446 |
| 5,194,087 | A | 3/1993 | Berg | |
| 5,573,589 | A | 11/1996 | Tanaka et al. | |

(Continued)

FOREIGN PATENT DOCUMENTS

EP         100100 A1    5/2000

(Continued)

OTHER PUBLICATIONS

Derwent-Acc-No. 2001-614551, abstract of Korean Patent Specification No. 2001028242A (Apr. 2001).*

*Primary Examiner*—Anthony J. Green
(74) *Attorney, Agent, or Firm*—Patrick J. Hofbauer

(57) ABSTRACT

A sound-absorbing and fire-insulating wall covering includes, a cured mixture of: (i) 5-20% by weight mineralized wood fibre; (ii) 20-60%/by weight sand with an $SiO_2$ content of less than 5% by weight and a greywacke content of at least 30% by weight; and (iii) 20-50% by weight cement. A method of preparing a fire-insulating wall covering includes a step of mixing, relative to the cured weight, 5-20% by weight mineralized wood fibre, 30-60% by weight sand with an $SiO_2$ content smaller than 5% by weight and a greywacke content of at least 30% by weight, and 20-50% by weight cement. Then 10-30% by weight water is added. Thereafter the mixture is cured to form the fire-insulating wall covering.

26 Claims, 4 Drawing Sheets

U.S. PATENT DOCUMENTS

| | | | |
|---|---|---|---|
| 5,795,515 A | 8/1998 | Fischer | |
| 6,138,430 A * | 10/2000 | Van Acoleyen et al. | 52/745.19 |
| 6,547,873 B1 * | 4/2003 | Ramirez de Arellano | 106/724 |
| 6,942,726 B2 * | 9/2005 | Cook et al. | 106/644 |
| 2003/0172849 A1 * | 9/2003 | Collier | 106/805 |

FOREIGN PATENT DOCUMENTS

| | | | |
|---|---|---|---|
| JP | 59-8654 A | * | 1/1984 |
| JP | 3-151446 A | * | 6/1991 |
| WO | WO01/07728 A1 | * | 2/2001 |

* cited by examiner

FIRE-INSULATING WALL COVERING AND A PREPARATION METHOD FOR SAME

The present invention relates to a fire-insulating wall covering and to a method for preparing same. The present invention relates particularly to a fire-insulating and preferably also sound-absorbing wall covering which meets currently stringent requirements in respect of fire-insulating properties. Such a fire-insulating wall covering can be applied in tunnels, underground spaces such as shopping centres and the like.

Fire-insulating wall coverings known at the present time do not fully satisfy the stringent requirements in respect of fire-insulating properties. In the case of a fire load on such a wall covering, for instance for 120 minutes, and a temperature on the fire side lying in the range of 1100 to 1350° C. for these two hours, these fire-insulating properties mean, among other things, that this wall covering insulates against fire such that on the side of the wall covering remote from the fire the temperature remains relatively low, and particularly below 225° C., preferably below 200° C.

The wall covering must moreover have good sound-absorbing properties and is asbestos-free.

The invention has for its object to provide such a fire-insulating and sound-absorbing wall covering as well as a method for preparation thereof. It is noted here that the wall covering can be applied per se, but is preferably applied as wall covering arranged on a supporting layer, for instance a concrete layer which can optionally be strengthened with a reinforcement. The underlying layers are thus protected against high temperatures.

This is achieved according to the invention with a fire-insulating wall covering comprising a cured mixture of:
  i) 5-20% by weight mineralized wood fibre;
  ii) 20-60% by weight sand with an $SiO_2$ content of less than 5% by weight and a greywacke content of at least 30% by weight; and
  iii) 20-50% by weight cement.

The fire-insulating wall covering is in fact based on a cured cement plate having incorporated therein a specific type of wood fibre and a specific type of sand.

The applied wood fibre for inter alia sound absorption is a mineralized wood fibre. Such a mineralized wood fibre is obtained by bringing wood fibres into contact with a solution of aluminium sulphate. The wood fibres are generally obtained from residual wood which is processed in different steps to form wood fibre with a moisture content of about 15-25% (atro basis). The aluminium sulphate is added in a quantity of about 2.5% relative to the wood fibre and supplemented with a quantity of water, whereby the moisture percentage rises to about 100% (atro). The obtained wood fibres, which are thus covered with aluminium sulphate, are the mineralized wood fibres applied in the fire-insulating wall covering according to the invention.

The applied aluminium sulphate is of standard chemical quality.

The sand is a specific sand type since it is less than 5% by weight $SiO_2$. The sand further contains at least 30% by weight greywacke. Greywacke is a type of stone containing feldspar, apatite and the like. Clay mineral may also be present. It is a clastic sedimentary rock with a density of for instance 2.6 kg per m³. The greywacke can be applied in different grain size distributions (or combinations), where the grain size distribution is such that the average particle size can be around 1 mm, 4-8 mm, 11-16 mm.

The cement used is generally a portland cement, in particular a portland slag cement.

For an optimum fire-resistant property the wall covering preferably has a content of mineralized wood fibre of preferably 7-15% by weight, more preferably 10-15% by weight. By selecting the content of mineralized wood fibre subject to the desired properties, not only is an optimum fire-resistant property obtained but also an optimum sound-insulating property. It is striking in this respect that use is made of a component based on wood fibre to obtain fire-resistant properties.

The fire-insulating wall covering preferably contains 35-50% by weight sand, while the $SiO_2$ content is preferably lower than 2.5% by weight, more preferably lower than 2% by weight. By opting for a relatively low $SiO_2$ content in combination with an optimal choice of the quantity of greywacke (preferably at least 40% by weight. and still more preferably at least 50% by weight), optimum fire-insulating properties are obtained and the fire breakthrough can be extended a very long time and far beyond the test time (2 hours).

A fire-insulating wall covering is-found to suffice well in practice if it preferably contains
  i) 10-15% by weight mineralized wood fibre;
  ii) 35-50% by weight sand with an SiO2 content smaller than 2% by weight and a greywacke content preferably greater than 40% by weight. and more preferably greater than 50% by weight; and
  iii) 25-40% by weight cement.

The best properties are obtained if in this case the cement is a low-chromate cement. Persons having ordinary skill in the art will appreciate that the construction industry in Germany and in Scandinavia may now frequently utilize low-chromate cements which, in keeping with the *Approved Code of Practice* that was adopted by the German legislature in 1993, are cements that contain levels of water soluble chromates substantially at less than about 2 ppm in a bag of cement and/or in ready-mixed concrete. Such cements are herein throughout referred to as cements containing "low-chromate."

The fire-insulating and fire-resistant properties of the wall covering can be further improved if the mineralized wood fibres and/or the side of the wall covering to be exposed are provided with an impregnation which further improves the fire resistance and/or the durability of wood fibres. Such an impregnating agent is for instance the impregnating agent described in the German patent application 197 27998. This impregnating agent is preferably applied to the mineralized wood fibres in a quantity of 0.1-1% by weight, more preferably 0.1-0.5% by weight. In the case the wall covering is arranged on a wall to be exposed, it is recommended to apply the impregnating agent in a quantity of 30-500 gram per m², preferably 100-250 gram per m².

The fire-insulating wall covering according to the invention can in principle be formed on-site and cured on-site in a mould. It is however also possible for pre-cured plates to be taken to the location of use.

If the fire-insulating wall covering has an insufficient strength in itself and insufficient bearing capacity, it is recommended to arrange such a fire-insulating wall covering on a supporting layer, for instance a concrete layer or concrete plate.

In that case the fire-insulating wall covering can be formed on an already present concrete plate and attached thereto using connecting means. Another option is to arrange finished fire-insulating wall coverings on a prepared support layer using fixing means. Use is made in this case of openings arranged in the fire-insulating wall covering for arranging the fixing means and of plugs of fire-insulating wall covering to cover the fixing means.

In the case that a plurality of plates of fire-insulating wall covering according to the invention are applied, this results in joints. For optimal retention of the fire-insulating properties at the position of the joint, it is recommended to make use of an offset joint and to fill this joint with either fire-insulating wall covering in uncured form or with another fire-insulating seal.

A good fire-insulating wall covering is generally obtained according to the invention if relative to the cured weight are mixed 5-20% by weight mineralized wood fibre, 30-60% by weight sand with an $SiO_2$ content smaller than 5% by weight and a greywacke content of at least 30% by weight; and 20-50% by weight cement, and 10-30% by weight water is then added, where after the mixture is cured to form the fire-insulating wall covering. Wall thicknesses of 10 to 500 mm are generally possible.

Mentioned and other features of the fire-insulating wall covering according to the invention and of the method for preparing such a fire-insulating wall covering will be further elucidated hereinbelow with reference to two embodiments, which are only given by way of example without the invention being deemed limited thereto.

The novel features which are believed to be characteristic of the fire-insulating wall covering according to the present invention, as to its structure, organization, use and methods of operation and/or preparation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention.

For the preparation of the fire-insulating wall covering, use is made per $m^3$ of:

12% by weight mineralized wood fibre
32% by weight portland slag cement
42% by weight sand ($SiO_2$ content smaller than 5% by weight, greywacke content 42% by weight)
0.01% by weight pigment (chromium oxide)
0.1% by weight impregnating agent (DE 197 27998)
residual water.

This mixture is placed in a mould provided with profiles, recesses for fixing points, rebates and joints. The mass is vibrated, pressed and finally released onto a ground in order to cure. The formed plate is optionally sprayed at this moment with impregnating agent. Such a plate is applied in the embodiment shown in FIGS. 1 and 2.

In another embodiment the fire-insulating wall covering according to the invention for curing is arranged, for instance in a curved mould, onto a support layer of concrete already arranged therein. After curing these structural parts can be applied in for instance the embodiment according to FIGS. 3 and 4.

In another embodiment, preformed fire-insulating wall coverings according to the invention are placed in a mould after being provided with coupling means for coupling to the concrete layer to be arranged. Use is for instance made of wood screw bolts which protrude out of the surface and which will be taken up in the concrete layer to be arranged on this wall covering. Via the coupling means an optimal attachment is thus obtained between the concrete layer on the one hand and the wall covering according to the invention on the other.

Figure 1:
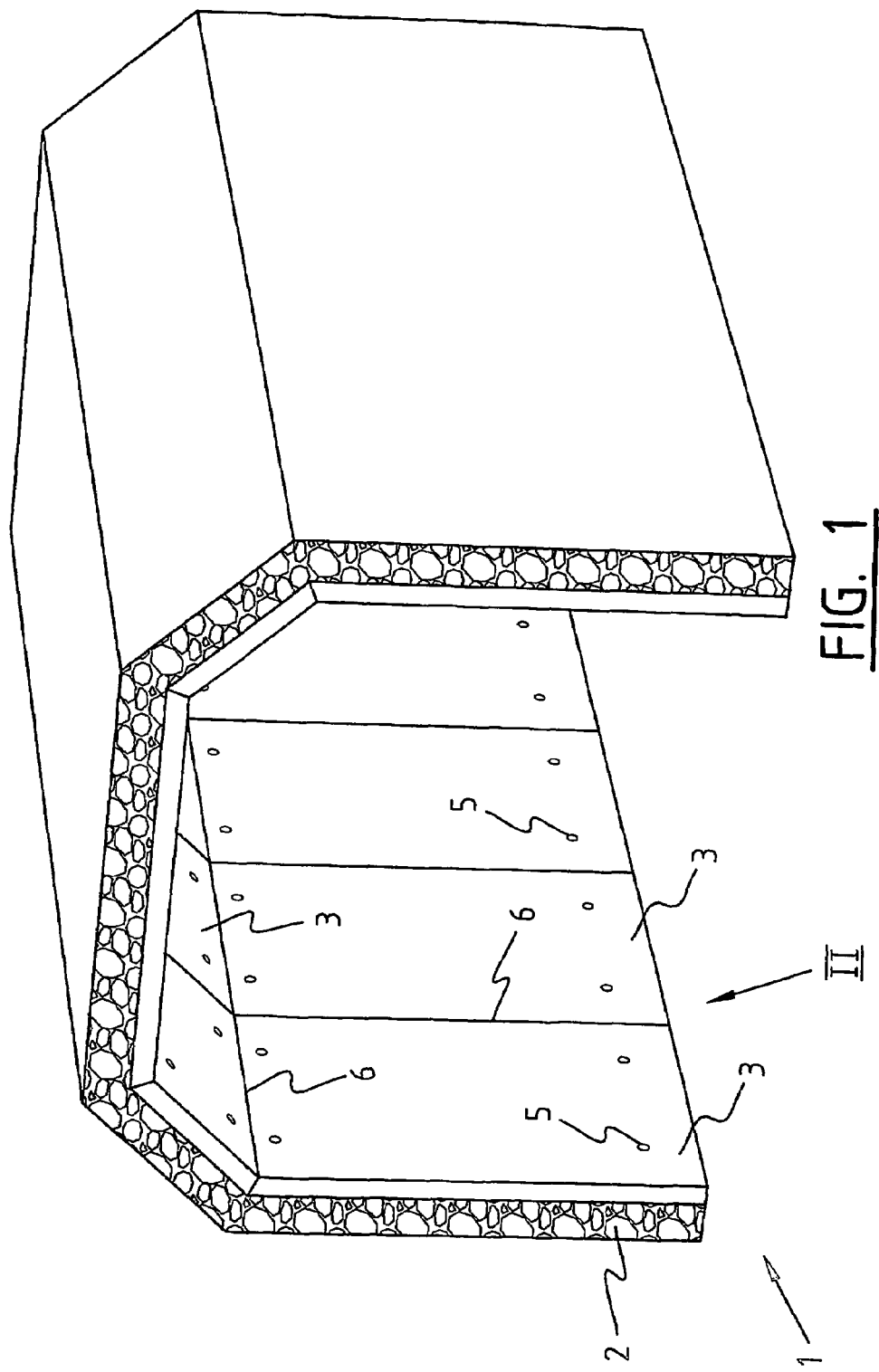
FIG. 1 is a front side perspective view of a tunnel provided with a fire insulating wall covering according to the invention, showing arrow II.

FIG. 1 shows a tunnel 1 provided with a concrete bearing structure 2 with fire-insulating wall coverings 3 according to the invention fixed thereto. Fixing means 4 are covered with conical plugs 5. Wall coverings 3 are mutually separated by a joint 6.

Figure 2:
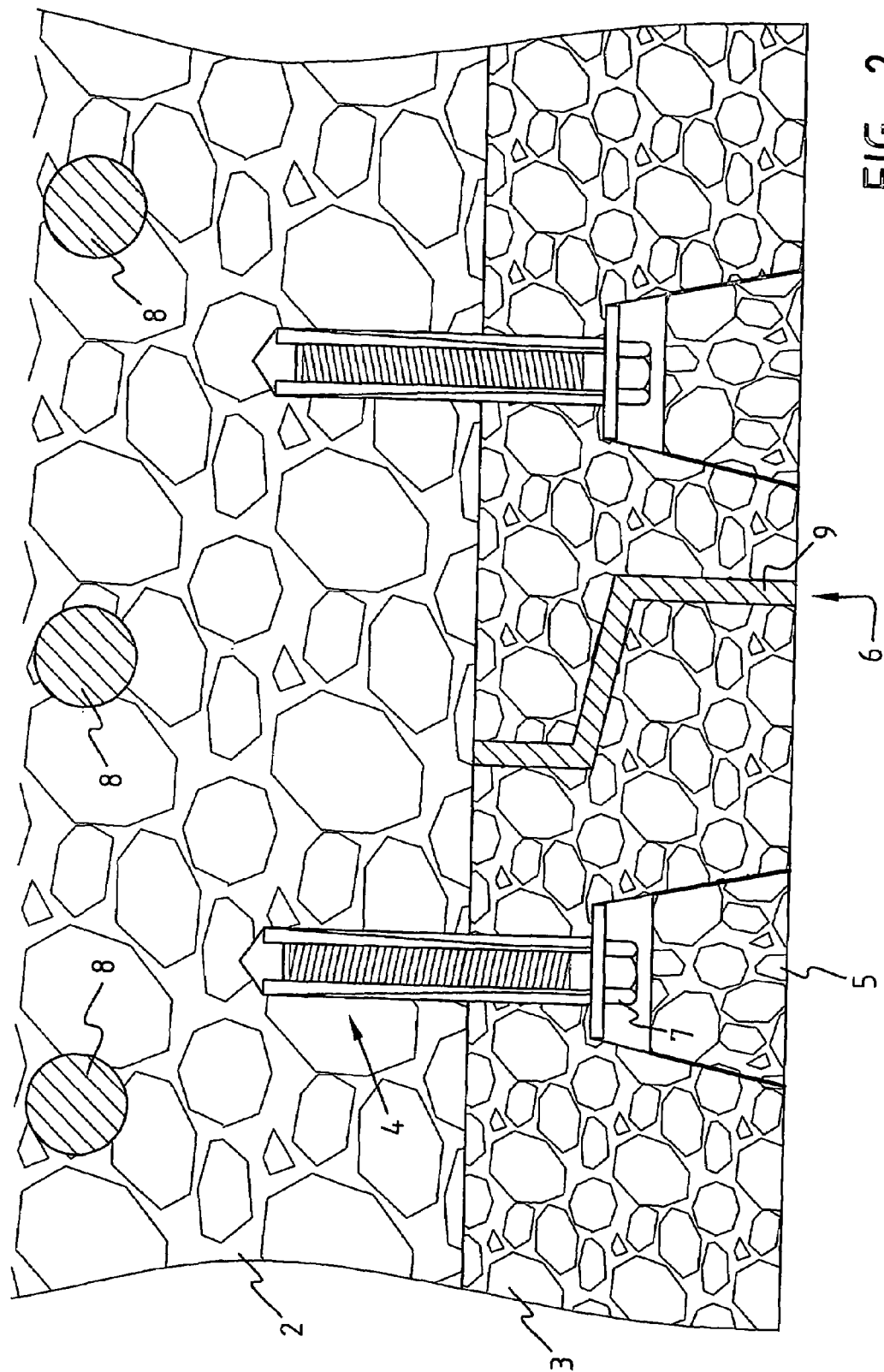
FIG. 2 is a bottom horizontal sectional view of the tunnel of FIG. 1, directed along arrow II.

FIG. 2 shows a detail in cross-section of the structure of this tunnel wall which is provided with wall coverings 3 according to the invention. Wall covering 3 is arranged in the concrete bearing structure 3 using fixing means 4, in this case cotter bolts 7. This bearing structure 3 is further provided with a reinforcement 8.

As shown in FIG. 2, joint 6 is an offset joint which is filled, wholly or only in the two straight joint parts, with a fire-insulating seal 9, optionally a mass of the insulating wall covering according to the invention still to be cured.

Figure 3:
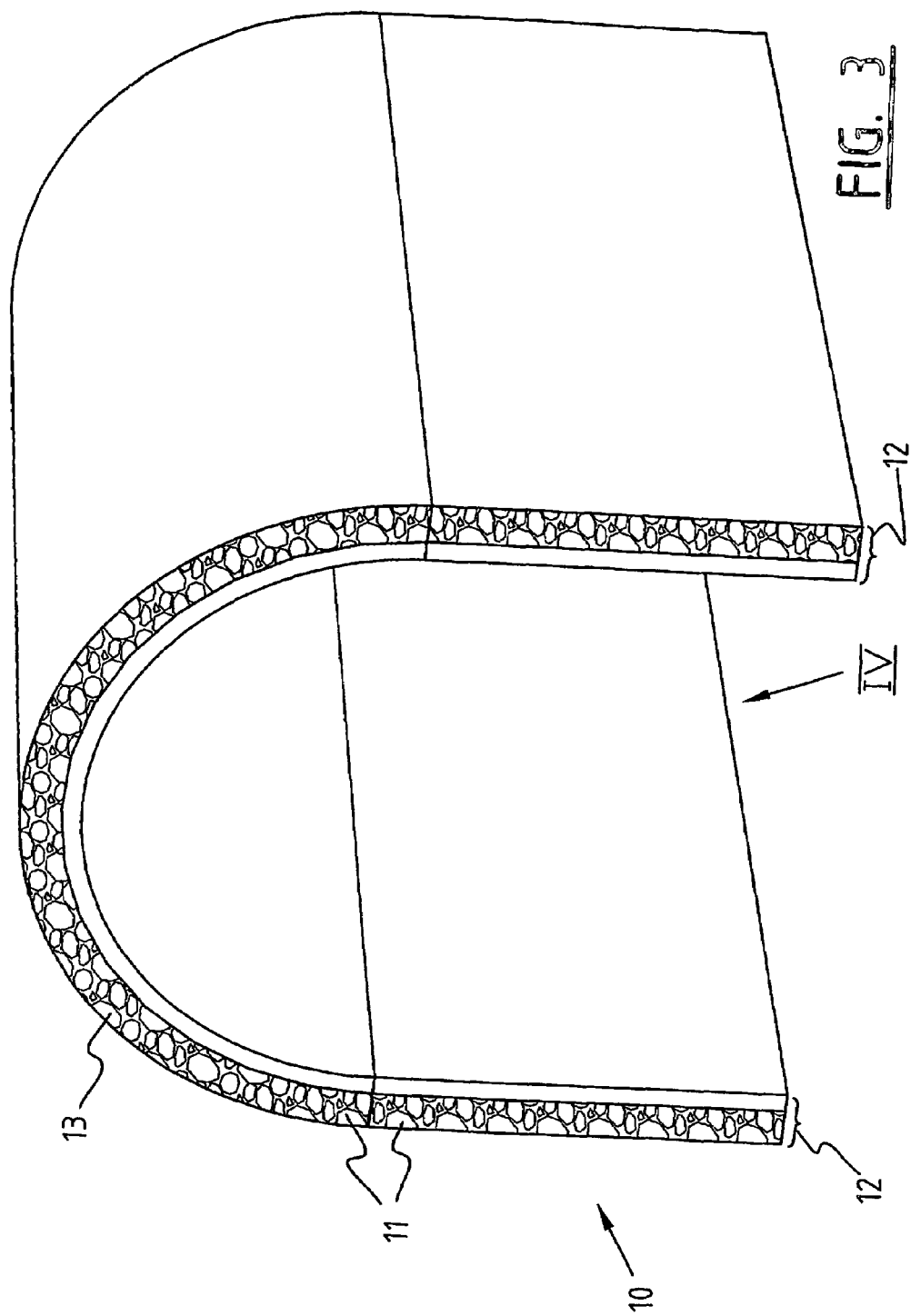
FIG. 3 is a front side perspective view of a pedestrian passage provided with a fire insulating wall covering according to the invention, showing arrow IV.
Figure 4:
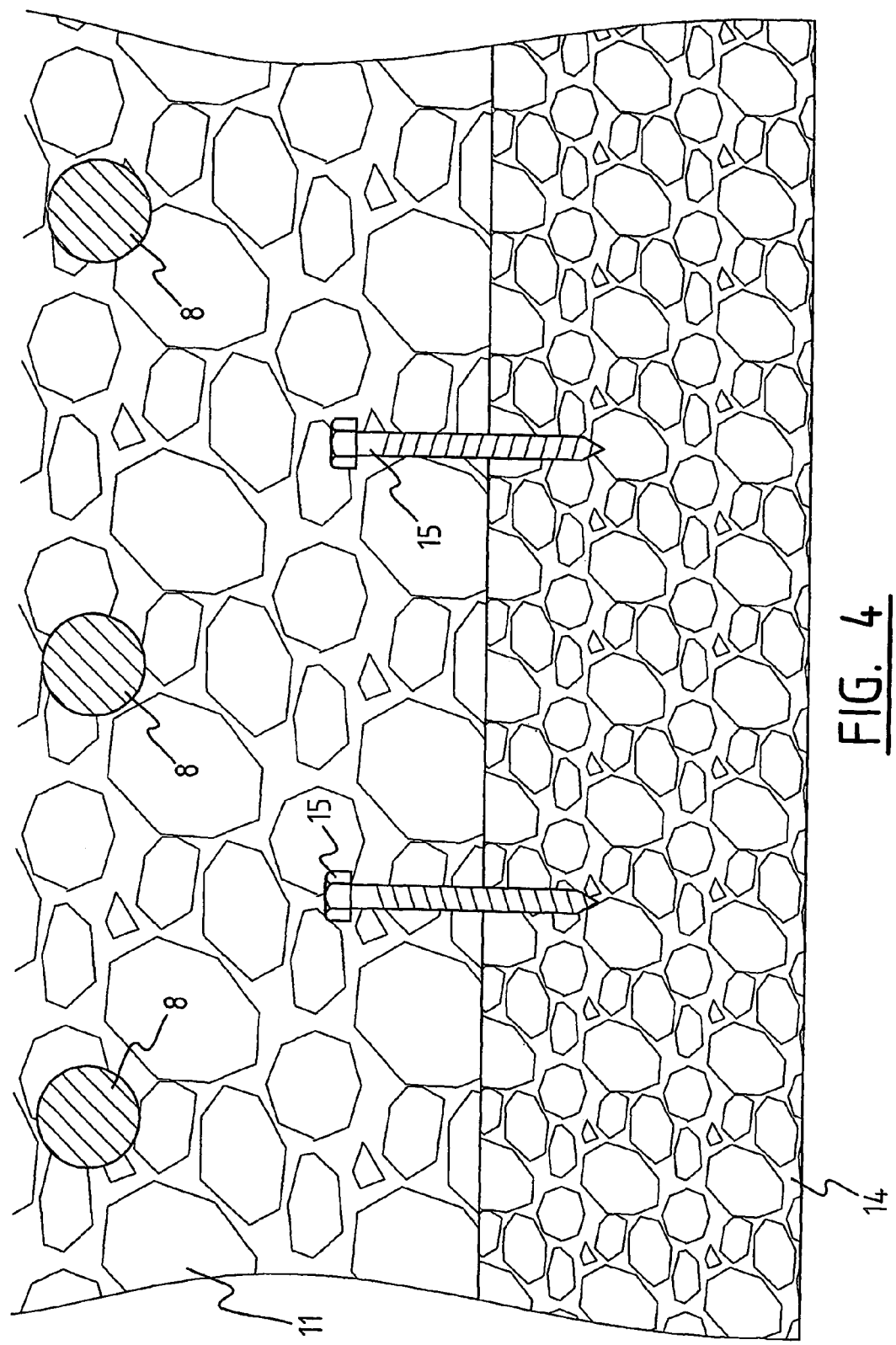
FIG. 4 is a bottom horizontal sectional view of the pedestrian passage of FIG. 3, directed along arrow IV.

FIGS. 3 and 4 show a pedestrian passage 10, for instance in an underground station. Use is made in this case of wall plates 12 and 13 which are preformed and set up in situ. Wall plates 12 and 13 once again comprise a concrete support structure and a wall covering 14 according to the invention. Wall covering 14 is provided with wood screw bolts 15 onto which is poured the concrete bearing structure 11, which is also provided with a reinforcement 8.

In both cases the wall coverings 3 and 14 according to the invention are found to satisfy the stringent requirements made in respect of fire-insulating properties. When exposed to a temperature regime as according to the table below, it was found that on the side of such a 100 mm wall covering remote from the fire the temperature remains below 120° C., and is even close to a temperature lying between 100 and 110° C.

| Time (min) | Temperature (° C.) |
| --- | --- |
| 0 | 20 |
| 3 | 890 |
| 5 | 1140 |
| 10 | 1200 |
| 30 | 1300 |
| 60 | 1350 |
| 90 | 1300 |
| 120 | 1200 |

The invention claimed is:

1. A fire-insulating wall covering, comprising a cured mixture of:
   i) about 5 to about 20% by weight mineralized wood fibre;
   ii) about 20 to about 60% by weight sand with an $SiO_2$ content of less than about 5% by weight and a greywacke content of at least about 30% by weight; and
   iii) about 20 to about 50% by weight cement.

2. A wall covering as claimed in claim 1, containing about 7 to about 15% by weight mineralized wood fibre.

3. A wall covering as claimed in claim 2, containing 10-15% by weight mineralized wood fibre.

4. A wall covering as claimed in claim 2, containing about 35 to about 50% by weight sand.

5. A wall covering as claimed in claim 4, wherein the sand has an $SiO_2$ content less than about 2.5% by weight.

6. A wall covering as claimed in claim 5, wherein the sand has an $SiO_2$ content less than 2% by weight.

7. A wall covering as claimed in claim 5, wherein the sand contains at least about 40% by weight greywacke.

8. A wall covering as claimed in claim 7, wherein the sand contains at least 50% by weight greywacke.

9. A wall covering as claimed in claim 7, containing about 25 to about 40% by weight cement.

10. A wall covering as claimed in claim 9, containing:
    i) about 10 to about 15% by weight mineralized wood fibre;
    ii) about 35 to about 50% by weight sand with an $SiO_2$ content less than about 2% by weight and a greywacke content greater than about 50% by weight; and
    iii) about 25 to about 40% by weight cement.

11. A wall covering as claimed in claim 10, containing about 0.1 to about 1% by weight impregnating agent.

12. A wall covering as claimed in claim 11, containing 0.1-0.5% by weight impregnating agent.

13. A wall covering as claimed in claim 10, containing about 30 to about 500 grams per $m^2$ impregnating agent.

14. A wall covering as claimed in claim 13, containing 100-250 grams per $m^2$ impregnating agent.

15. A wall covering as claimed in claim 1, containing about 35 to about 50% by weight sand.

16. A wall covering as claimed in claim 1, wherein the sand has an $SiO_2$ content less than about 2.5% by weight.

17. A wall covering as claimed in claim 16, wherein the sand has an $SiO_2$ content less than 2% by weight.

18. A wall covering as claimed in claim 1, wherein the sand contains at least about 40% by weight greywacke.

19. A wall covering as claimed in claim 18, wherein the sand contains at least 50% by weight greywacke.

20. A wall covering as claimed in claim 1, containing about 25 to about 40% by weight cement.

21. A wall covering as claimed in claim 1, containing:
    i) about 10 to about 15% by weight mineralized wood fibre;
    ii) about 35 to about 50% by weight sand with an $SiO_2$ content less than about 2% by weight and a greywacke content greater than about 50% by weight; and
    iii) about 25 to about 40% by weight cement.

22. A wall covering as claimed in claim 1, containing about 0.1 to about 1% by weight impregnating agent.

23. A wall covering as claimed in claim 22, containing 0.1-0.5% by weight impregnating agent.

24. A wall covering as claimed in claim 1, containing about 30 to about 500 grams per $m^2$ impregnating agent.

25. A wall covering as claimed in claim 24, containing 100-250 grams per $m^2$ impregnating agent.

26. A method of preparing a fire-insulating wall covering comprising a cured mixture of:
    i) about 5 to about 20% by weight mineralized wood fibre;
    ii) about 20 to about 60% by weight sand with an $SiO_2$ content of less than about 5% by weight and a greywacke content of at least about 30% by weight; and
    iii) about 20 to about 50% by weight cement;
wherein relative to a cured weight of the mixture are mixed about 5 to about 20% by weight mineralized wood fibre, about 20 to about 60% by weight sand with an $SiO_2$ content less than about 5% by weight and a greywacke content of at least about 30% by weight, and about 20 to about 50% by weight cement, and about 10 to about 30% by weight water is then added, where after the mixture is cured to form the fire-insulating wall covering.

* * * * *